United States Patent
Ho et al.

(10) Patent No.: US 7,583,662 B1
(45) Date of Patent: Sep. 1, 2009

(54) VOICE VIRTUAL PRIVATE NETWORK

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 884 days.

(21) Appl. No.: 11/105,043

(22) Filed: Apr. 12, 2005

(51) Int. Cl.
*H04L 12/66* (2006.01)
(52) U.S. Cl. .................. 370/356; 370/254
(58) Field of Classification Search ............. 370/466, 370/352, 350; 707/10; 709/246
See application file for complete search history.

(56) References Cited

U.S. PATENT DOCUMENTS

| | | | | |
|---|---|---|---|---|
| 5,920,699 A * | 7/1999 | Bare | ............. | 709/225 |
| 6,363,424 B1 * | 3/2002 | Douglas et al. | ............. | 709/224 |
| 6,611,867 B1 * | 8/2003 | Bowman-Amuah | ......... | 709/224 |
| 7,103,008 B2 * | 9/2006 | Greenblat et al. | ............. | 370/258 |
| 7,170,905 B1 * | 1/2007 | Baum et al. | ............. | 370/467 |
| 7,222,301 B2 * | 5/2007 | Makagon et al. | ............. | 715/727 |
| 7,289,493 B1 * | 10/2007 | Vera | ............. | 370/356 |
| 7,421,469 B1 * | 9/2008 | Liu et al. | ............. | 709/204 |
| 7,522,632 B2 * | 4/2009 | La Porta et al. | ............. | 370/466 |
| 2003/0123428 A1 * | 7/2003 | Lakaniemi et al. | ......... | 370/350 |
| 2005/0084082 A1 * | 4/2005 | Horvitz et al. | ......... | 379/114.06 |
| 2005/0091407 A1 * | 4/2005 | Vaziri et al. | ............. | 709/246 |
| 2005/0135586 A1 * | 6/2005 | Amick | ............. | 379/201.1 |
| 2005/0157660 A1 * | 7/2005 | Mandato et al. | ............. | 370/254 |
| 2005/0160095 A1 * | 7/2005 | Dick et al. | ............. | 707/10 |
| 2006/0023674 A1 * | 2/2006 | Goring et al. | ............. | 370/338 |
| 2006/0026669 A1 * | 2/2006 | Zakas | ............. | 726/6 |
| 2006/0104306 A1 * | 5/2006 | Adamczyk et al. | ......... | 370/466 |
| 2006/0116127 A1 * | 6/2006 | Wilhoite et al. | ............. | 370/466 |
| 2006/0156086 A1 * | 7/2006 | Flynn et al. | ............. | 714/712 |
| 2006/0165040 A1 * | 7/2006 | Rathod et al. | ............. | 370/335 |
| 2006/0187900 A1 * | 8/2006 | Akbar | ............. | 370/352 |
| 2007/0100981 A1 * | 5/2007 | Adamczyk et al. | ......... | 709/223 |
| 2008/0062966 A1 * | 3/2008 | den Hartog et al. | ......... | 370/352 |

* cited by examiner

*Primary Examiner*—Thong H Vu
(74) *Attorney, Agent, or Firm*—Michele Liu Baillie; North Shore Patents, P.C.

(57) ABSTRACT

Embodiments of the present invention include a Voice Virtual Private Network (Voice VPN) and methods for providing access to remote peer users across same. In one embodiment, voice and communication services of one or more corporate network are provided to remote user terminals across a Voice VPN Gateway. The level and type of access to voice and communication services provided can be determined statically, dynamically, or adaptively based on user data or user habits or history.

8 Claims, 10 Drawing Sheets

VOICE VIRTUAL PRIVATE NETWORK

BACKGROUND

1. Field

This invention relates generally to telecommunications, more specifically, to a Voice Virtual Private Network (Voice VPN) to provide secure access to corporate voice and communications functionalities for corporate users.

2. Related Art

The era of Private Branch Exchange (PBX) arrived in 1976 when AT&T introduced its System 75 all digital switch for business. In a few years, PBXs quickly replaced WATS and Centrex as the voice communications of choice for corporations, improving business efficiency and productivity. In the ensuing years, PBX remains the flagship, and perhaps the only infrastructure with which corporate voice communications are provided. During this time, emerging technologies, particularly the 800-number service and Call Center have enhanced the capabilities of PBX, extending its reach, and creating new business opportunities.

After three decades of dominance in the corporate world however, a significant transformation of the corporate voice communications is now taking place. The emergence of various access methods, for example, cellular wireless, WiFi, and cordless phones, have given users the mobility they never had before. This newfound convenience has irreversibly changed the work style of corporate users.

The proliferation of the Internet and the deployment of Customer Relationship Management (CRM) solutions have greatly reduced the role of traditional Call Center as corporate users and customers can readily retrieve information, secure or otherwise, through the Web interface. On the other hand, such technologies have also improved productivity and shaped corporate user expectations. Similarly, the maturing Voice over IP (VoIP) and other IP information technologies open up a unique opportunity for rich, real-time and multimedia communications, legitimately challenging the status quo of PBXs in their current form.

Despite this inevitable transition, however, the principal use of voice communications in the corporate businesses sector remains unchanged. Traditional PBXs are undergoing progressive evolution to integrate with VoIP, WiFi, Corporate Directory, among other functions. At the same time, emerging IP-based communications services such as email and Instant Messaging are extending to include audio and voice capabilities. These enhancements however, are limited to corporate users who are within the realm of the corporate networks. Secure and ubiquitous extension of these services to remote corporate users is either impossible or infeasible because the supporting infrastructures or apparatus simply do not exist.

Some of the issues solved by the present invention are best illustrated by examples. In one scenario, a salesperson, while working with a customer, needs to reach a technical department for information. Without access to the corporate directory, he decides to call a colleague in the sales department, and asks her to transfer the call. After a successful call transfer however, the engineer who receives the call has no reliable way to authenticate the caller and therefore may not feel comfortable disclosing the sensitive or proprietary information needed by the salesperson to make the sale.

In another scenario, an executive, traveling to Asia, will need to join a scheduled teleconference at 9 pm Pacific time being hosted on a U.S. corporate PBX telephone system. Prior to departure from the U.S., the executive would need to collect all the needed information, such as conference time, PIN code, phone number, etc. The executive will also need to look-up the International Direct Dial number, the United States Country code, and/or other country specific access numbers unique to the local dialing plan. In addition to complexity of making the telephone call to join the teleconference, the billing and possible reimbursement can also be complicated. When the executive returns from the business trip, the telephony usage during the trip will have to be reported, recorded and processed separately.

In another scenario, a telecommuter working from home needs the full set of corporate voice and communication services to do his work. Current solutions typically include proprietary phone and software at home and complementary gateway equipment and software at the corporate site. Such solutions often require extensive development and support and are probably not feasible for massive deployment.

In yet one other scenario, a traveling salesman is working in a coffee shop that provides WiFi Internet service. His cell phone is out of the coverage area of a compatible cellular service. While he can establish a data connection from his PC to the corporate VPN over the Internet to retrieve company information, he is unable to reach the corporate voice service.

The above examples illustrate a need for a fundamentally new corporate infrastructure or apparatus to support a secure and ubiquitous access to corporate voice and communication services for corporate users, and hence a need for a method for a Voice VPN.

SUMMARY

Embodiments of the present invention include methods for setting up, accessing and terminating services of a Voice VPN. In one embodiment, the present invention includes a Voice VPN Gateway that acts as the interface between a Corporate User Terminal and Corporate Voice and Communication Service Servers for providing voice and communication services to a corporate user.

In one embodiment, the Voice VPN provides remote corporate users with full or partial access to corporate voice and communication services such as making and accepting telephone calls, and accessing corporate telephones directories.

In another embodiment, the Voice VPN can facilitate calls and other services between remote peer parties who can be corporate voice service users inside the realm of the corporate voice network, other Voice VPN users, users connected to the corporate network via other networks such as PSTN or any combination thereof.

DETAILED DESCRIPTION

Figure 1:
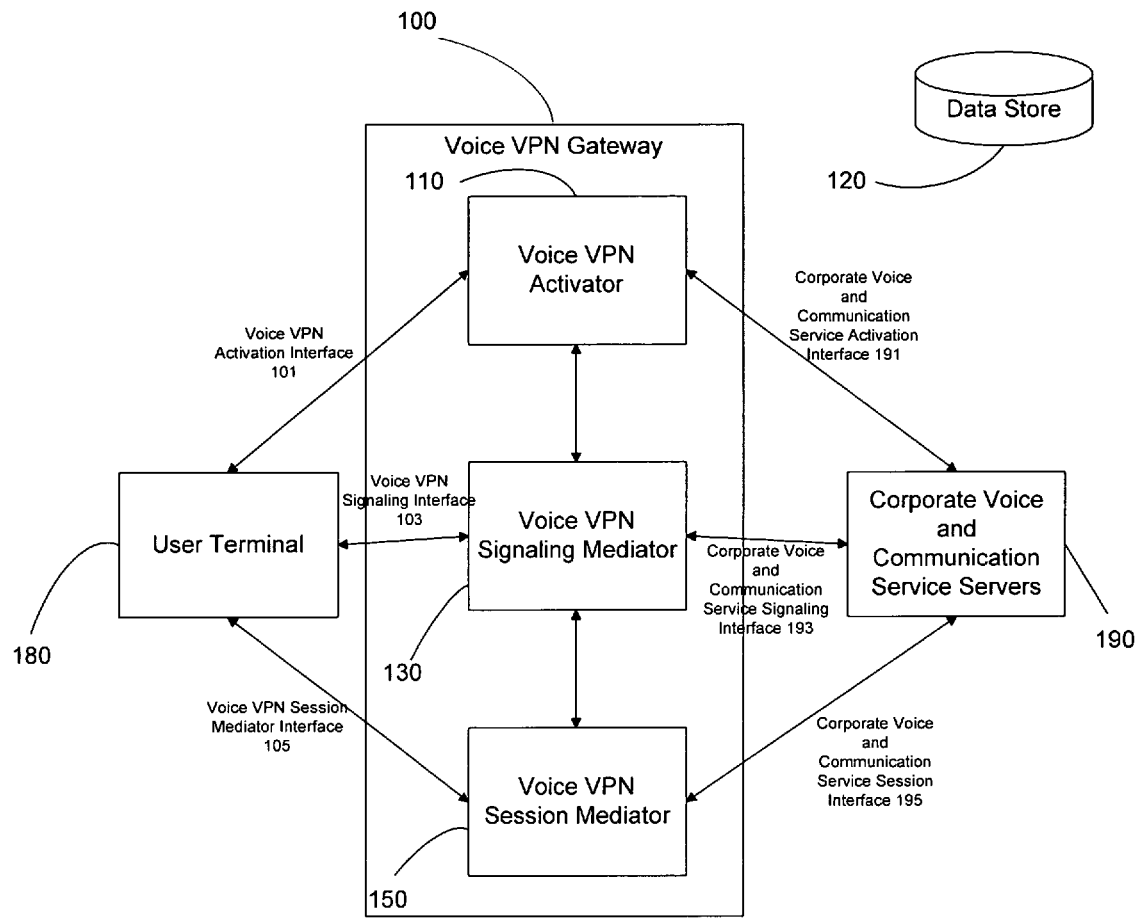
FIG. 1 is a diagram illustrating a Voice Virtual Private Network Gateway system according to one embodiment of the present invention.

FIG. 1 is Voice Virtual Private Network (Voice VPN) Gateway. A Voice VPN Gateway facilitates access to a corporate Voice VPN. A Voice VPN provides corporate users ubiquitous and secure access to corporate voice and communication services. With a Voice VPN corporate users can access corporate voice and communication services through a variety access networks. A Voice VPN Gateway is the interface between user terminals such as phones and Corporate Voice and Communication Service Servers, such as a corporate telephone system. The present invention is a system and method for a Voice VPN.

FIG. 1 illustrates a Voice VPN Gateway. Voice VPN Gateway 100 has three modules—a Voice VPN Activator 110, a Voice VPN Signaling Mediator 130 and a Voice VPN Session Mediator 150. User Terminal 180 interacts with the Voice VPN Activator 110 over Voice VPN Activation Interface 101.

Corporate users access the corporate Voice VPN using a User Terminal 180. User Terminal 180 uses the Voice VPN Activation Interface 101 to request access to corporate Voice VPN, and to request one or more corporate voice and communication services.

In one embodiment, Voice VPN Activation Interface 101 is based on Internet Protocol.

In one embodiment, Voice VPN Activation Interface 101 is based on Web technologies including, but not limited to, HTTP, Web Services, Java.

In one embodiment, Voice VPN Activation Interface 101 is based on a client-server protocol. User Terminal 180 is a client sending requests to the server that is Voice VPN Activator 110.

In one embodiment, the access network is a public telephony network such as Public Switched Telephone Network (PSTN) or Voice over IP Telephone network (VoIP).

In one embodiment, Voice VPN Signaling Interface 103 for the corporate phone service is based on Web technologies.

In one embodiment, Voice VPN Signaling Interface 103 is based on SIP technology. In such an embodiment, User Terminal 180 includes a SIP user agent, whereas Voice VPN Signaling Mediator 130 includes a SIP proxy or a SIP server.

In one embodiment, Voice VPN Signaling Interface 103 is based on H.323 technology.

In one embodiment, the access network is the Internet.

In one embodiment, the access network is a private network such as a corporate virtual private network, or an extranet between the corporate network and other partner corporate networks.

In one embodiment, the access network is inside the corporate network where the corporate user is in a remote office.

In one embodiment, the corporate policy requires security control over the use of corporate voice and communication services with a desktop phone.

To use a corporate voice and communication service, User Terminal 180 interacts with Voice VPN Signaling Mediator 130 over the Voice VPN Signaling Interface 103 and Voice VPN Session Mediator 150 over Voice VPN Session Mediator Interface 105.

In one embodiment, User Terminal 180 uses Voice VPN Signaling Interface 103 to set up a corporate voice and communication service session.

In one embodiment, a corporate voice and communication service is the corporate phone service.

In one embodiment, Voice VPN Signaling Interface 103 is based on Internet Protocol.

In one embodiment, Voice VPN Signaling Mediator 130 is software residing in the User Terminal 180, and Voice VPN Signaling Interface 103 is an internal programming interface such as a function call or an inter-method call (IPC).

After a corporate voice and communication service session is established, User Terminal 180 conducts the service session over the Voice VPN Session Mediator Interface 105.

In one embodiment, the format of the service session content depends on the corporate voice and communication service.

In one embodiment, the service session is secure.

In one embodiment, a corporate voice and communication service is the corporate phone service.

In FIG. 1, Voice VPN Gateway 100 communicates with Corporate Voice and Communication Service Servers 190 on behalf of the corporate user throughout a Voice VPN session of the corporate user. Thus, Corporate Voice and Communication Service Servers 190 consider the corporate user as if the corporate user is accessing the corporate voice and communication services from within the corporate network. In order to act on behalf of the corporate user, the Voice VPN Gateway 100 mediates the communication between the User Terminal 180 and the Corporate Voice and Communication Service Servers 190. Voice VPN Activator 110 interacts with Corporate Voice and Communication Service Servers 190 over Corporate Voice and Communication Service Activation Interface 191 to perform user authentication for accessing corporate voice and communication services.

In one embodiment, Corporate Voice and Communication Service Servers 190 do not require additional authentication.

In one embodiment, Voice VPN Signaling Mediator 130 interacts with Corporate Voice and Communication Service Servers 190 over Corporate Voice and Communication Service Signaling Interface 193 for service specific signaling procedures. Voice VPN Session Mediator 150 establishes a corporate voice and communication service session with the peer over the Corporate Voice and Communication Service Session Interface 195.

In one embodiment, the corporate voice and communication service session is specific to the corporate voice and communication service.

In one embodiment, the corporate voice and communication service session is between Voice VPN Session Mediator 150 and Corporate Voice and Communication Service Servers 190.

In another embodiment, the corporate voice and communication service session is between Voice VPN Session Mediator 150 and the user terminal of the peer.

In one embodiment, Voice VPN Session Mediator Interface 105 for the corporate phone service is based on voice over packet technology. Voice signals are sampled, digitized and put into IP packets.

In one embodiment, the voice over packet technology is similar to Voice over IP technology.

In one embodiment, the voice packets are transferred using Real Time Transport Protocol (RTP).

In one embodiment, a streaming protocol such as Real Time Streaming Protocol (RTSP) is used.

In one embodiment, the voice packets are transferred using any streaming or real time transport protocols.

In one embodiment Voice VPN Session Mediator Interface 105 includes a plurality of network attributes such as security, quality of services, jitter and network delay attributes.

In one embodiment, the voice packets are encrypted.

In one embodiment, the voice packets are transmitted with the highest priority.

In one embodiment, the voice packets are transmitted within a maximum end-to-end 35 millisecond delay.

When corporate phone services are needed, a corporate user can instruct User Terminal 180 to request the corporate phone service from Voice VPN Activator 110.

In one embodiment Voice VPN Activation Interface 101 is based on Web technology. User Terminal 180 includes a Web browser and Voice VPN Activator 110 provides a Web page for User Terminal 180 to submit the request for the corporate phone service.

In one embodiment, User Terminal 180 sends the request based on a client-server protocol model. Voice VPN Activator 110 determines the corporate user phone service information.

In one embodiment, the corporate user phone service information includes corporate user identity data for the corporate phone service.

In one embodiment, the corporate user phone service information includes the capabilities of User Terminal 180.

In one embodiment, the capabilities of User Terminal 180 include the codec capability, the security attributes, and the network transport capability such as quality of services.

In one embodiment, User Terminal 180 transmits the corporate user phone service information to Voice VPN Activator 110.

In one embodiment, Voice VPN Activator 110 retrieves the corporate user phone service information from Data Store 120. Voice VPN Activator 110 sends the corporate user phone service information to Voice VPN Signaling Mediator 130. Voice VPN Signaling Mediator 130 registers with Corporate Phone Service Server 190. Voice VPN Signaling Mediator 130 transmits a part or all of the corporate user phone service information to Corporate Phone Service Server 190 to activate the corporate phone service for the corporate user. Voice VPN Signaling Mediator 130 indicates to Voice VPN Activator 110 of the successful registration of the corporate phone service. Voice VPN Activator 110 subsequently responds to User Terminal 180 of a successful activation of the corporate phone service. The corporate user can start using the corporate phone service.

A corporate user can request a complete set or a partial set of phone service features. In one embodiment, a corporate user can request a set of phone service features such as making a phone call, receiving a phone call, and other corporate phone service features.

In one embodiment, a corporate user can request phone calling service only, in which case incoming calls are not routed to the corporate user.

In one embodiment, the corporate user ca request phone call receiving service only that delivers calls to User Terminal 180. In such an embodiment, the corporate user cannot make a call with the corporate phone service.

Figure 2:
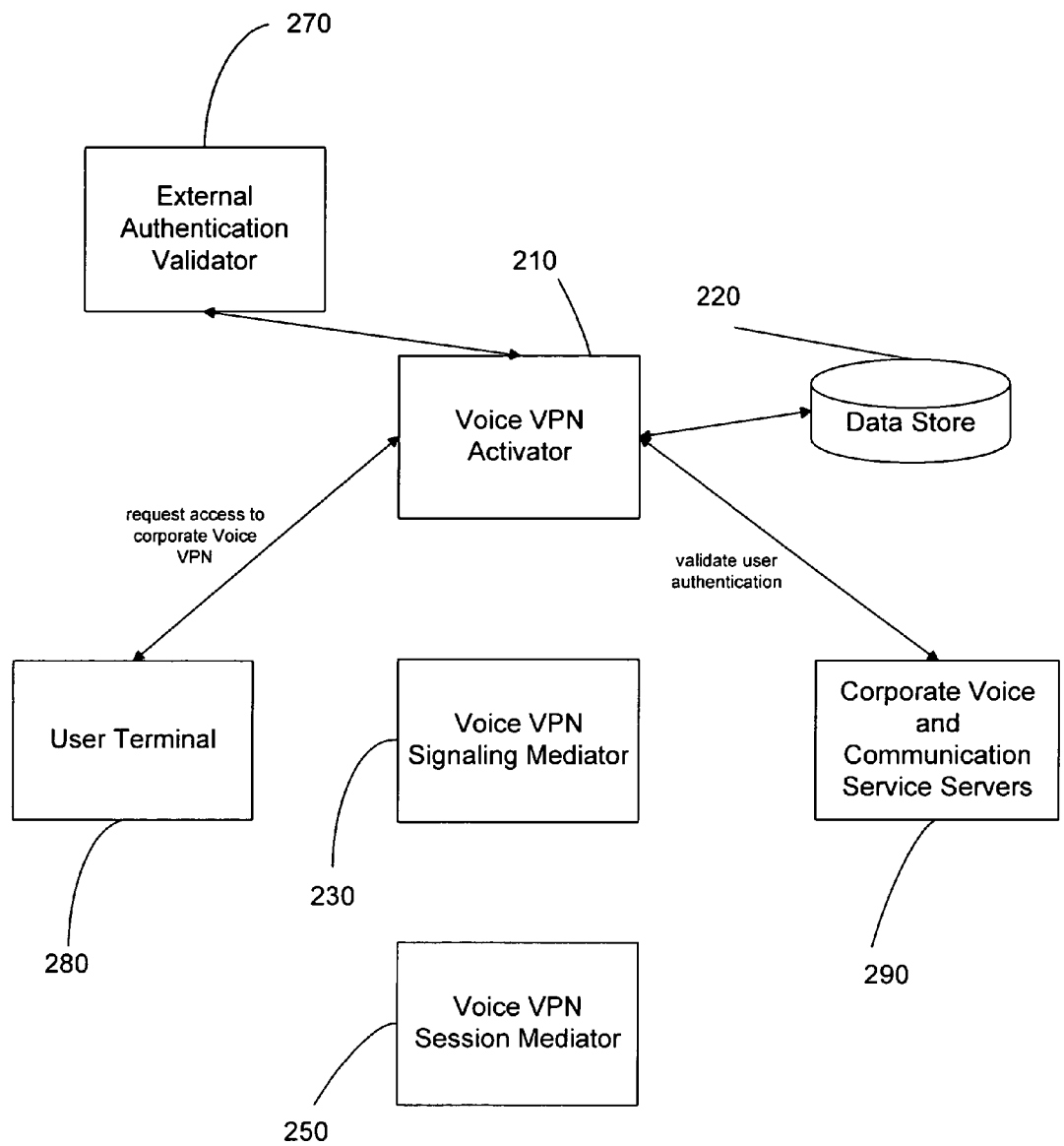
FIG. 2 is a diagram illustrating a method for accessing a corporate Voice Virtual Private Network according to one embodiment of the present invention.

FIG. 2 illustrates a method for requesting access to the corporate Voice VPN. User Terminal 280 sends a request to Voice VPN Activator 210. Voice VPN activator queries Data Store 220 for user authentication data and validates user authentication with Corporate Voice and Communication Service Servers 290.

In one embodiment User Terminal 280 provides the corporate user identity and a password. Voice VPN Activator 210 compares the corporate user identity and the password with the information in the Data Store 220.

In one embodiment, Voice VPN Activator 210 checks with External Authentication Validator 270 to validate the corporate user identity and the password.

In one embodiment, after validating a corporate user, Voice VPN Activator 210 requests user authentication with Corporate Voice and Communication Service Servers 290.

In one embodiment, Corporate Voice and Communication Service Servers 290 may require additional corporate user information. Voice VPN Activator 210 sends prompts to User Terminal 280 for necessary information.

In one embodiment, Corporate Voice and Communication Service Servers 290 do not require additional information.

In one embodiment, it is not necessary to perform user authentication for the Corporate Voice and Communication Service Servers 290. In such a case, the Voice VPN Activator 210 does not interact with the Corporate Voice and Communication Service Servers 290. After validating all necessary user authentications, Voice VPN Activator 210 responds positively to User Terminal 280. The corporate user is thus allowed access the corporate Voice VPN.

In one embodiment, Voice VPN Activator 210 notifies Corporate Voice and Communication Service Servers 290 that the corporate user terminates the access to any corporate voice and communication services.

In the embodiment where Voice VPN Activator 210 receives a termination request from User Terminal 280, Voice VPN Activator 210 responds to User Terminal 280 of a successful termination of the access to the corporate Voice VPN.

In FIG. 2, during the process of validating the corporate user's authentication, Voice VPN Activator 210 determines a plurality of corporate voice and communication services that are allowed for the corporate user.

In one embodiment, the allowed corporate voice and communication services are determined based on the corporate position or corporate role of the corporate user.

In one embodiment, the allowed corporate voice and communication services are determined based on the time of the day.

In one embodiment, the allowed corporate voice and communication services are determined based on the user's subscription of corporate voice and communication services.

In one embodiment, corporate voice and communication services are activated automatically according to a schedule. The allowed corporate voice and communication services will include the scheduled services when the corporate user accesses the Voice VPN at the appropriate time.

In one embodiment, the allowed corporate voice and communication services are determined based on a combination of criteria including the previous embodiments.

In one embodiment, the allowed corporate voice and communication services are determined based a particular corporate user's past use habits. Using artificial intelligence principles, it is possible to make the set of allowed and available voice and communications services dependent on adaptive logic including, but not limited to, various forms of fuzzy logic or Bayesian analysis. In this way a corporate user can adaptively be assigned a set of voice and communications services or be prompted to request services from a set of recently or most likely needed voice and communication services.

Upon determining the plurality of corporate voice and communication services, and confirming the corporate user's authentication, Voice VPN Activator 210 informs User Terminal 280 of the accessible corporate voice and communication services.

Figure 3:
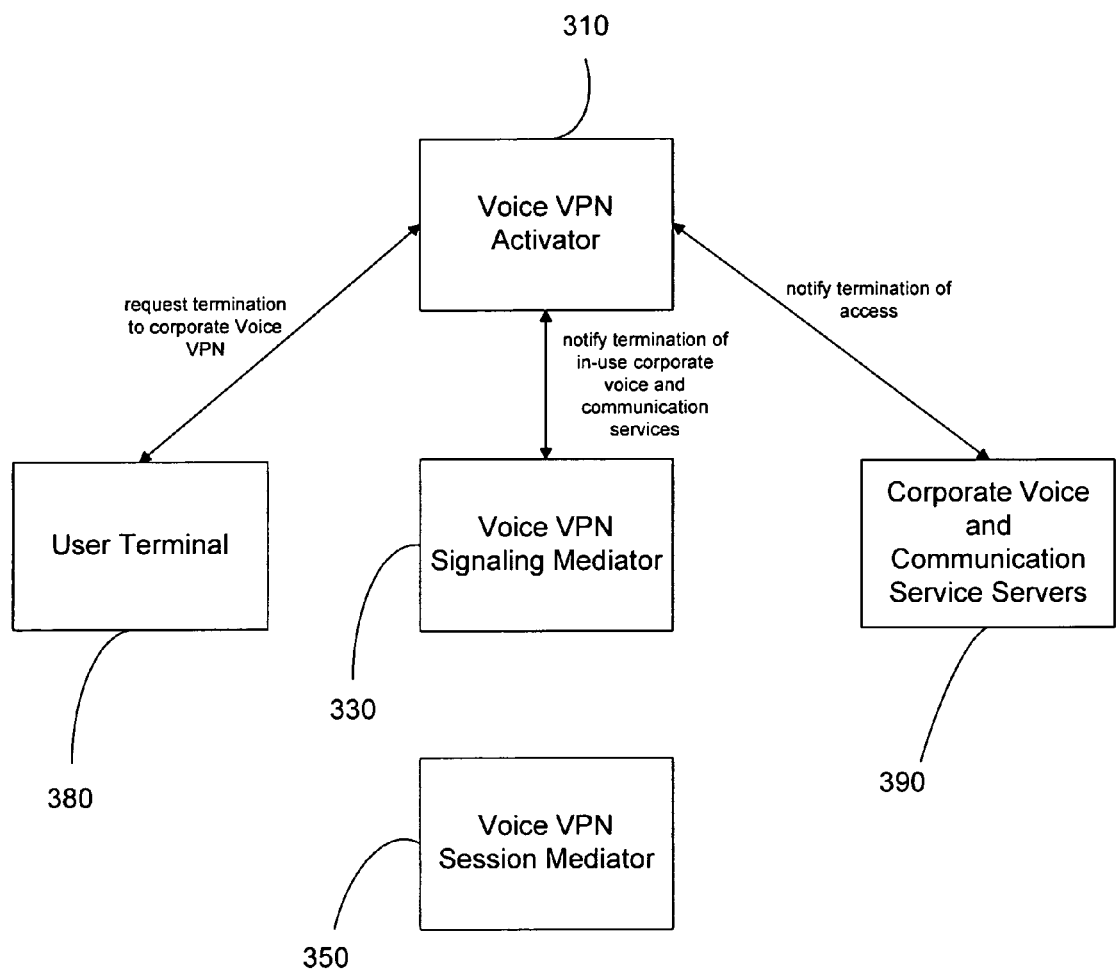
FIG. 3 is a diagram illustrating a method for terminating access to a corporate Voice Virtual Private Network according to one embodiment of the present invention.

FIG. 3 illustrates a method for terminating access to corporate Voice VPN. User Terminal 380 requests Voice VPN Activator 310 to terminate access to the corporate Voice VPN.

In one embodiment, Voice VPN Activator 310 determines User Terminal 380 is no longer using the corporate Voice VPN.

In one embodiment, User Terminal 380 is powered off. Voice VPN Activator 310 cannot continue communicating with User Terminal 380.

In one embodiment, Voice VPN Activator 310 terminates access to Voice VPN after not receiving a signal from User Terminal 380 for some time out period.

In one embodiment, the time out period is over 45 seconds.

In another embodiment, the time period is over 3 minutes. After the time out period expires Voice VPN Activator 310 terminates access to the corporate Voice VPN.

After Voice VPN Activator 310 receives a termination request or determines the termination of User Terminal 380, Voice VPN Activator 310 checks for any corporate voice and communication services in use. If there are any corporate voice and communication service in use, Voice VPN Activator 310 sends a request to Voice VPN Signaling Mediator 330 to terminate the corporate voice and communication service for the corporate user.

Figure 4:
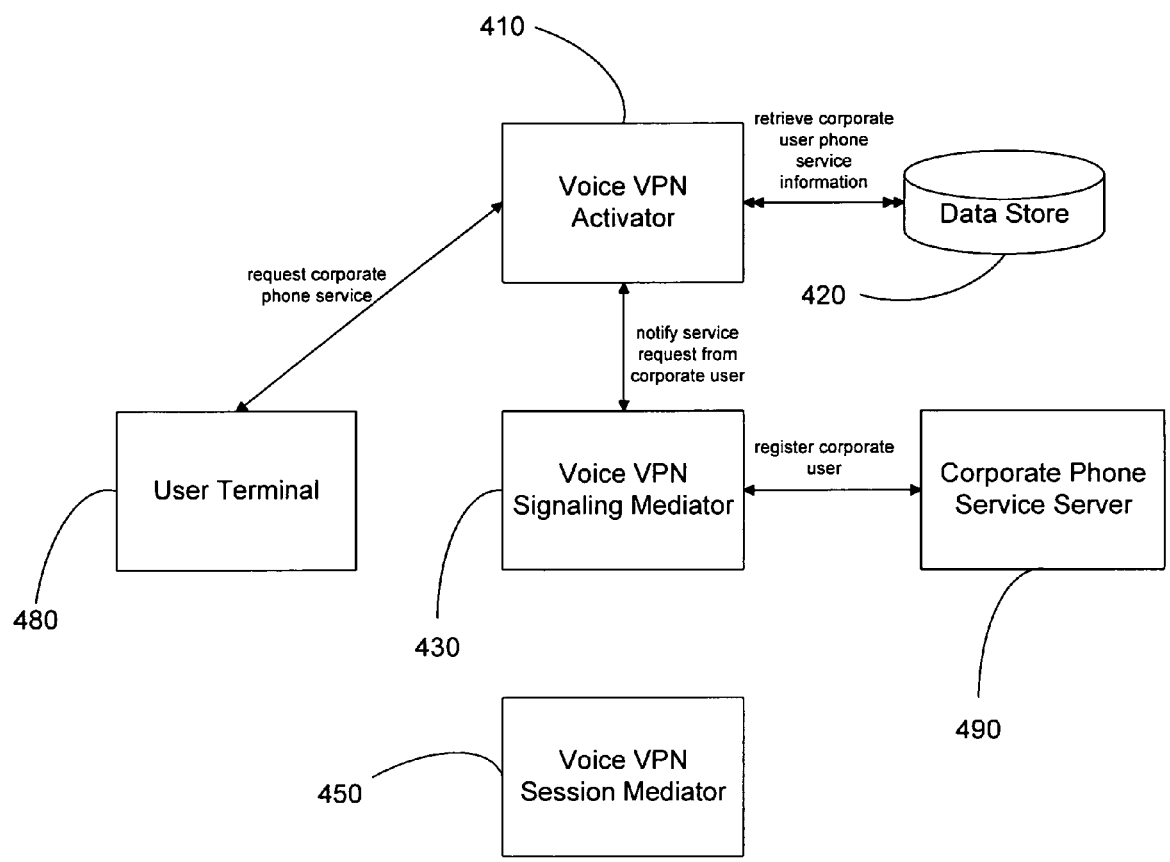
FIG. 4 is a diagram illustrating a method for activating corporate phone services according to one embodiment of the present invention.

FIG. 4 illustrates a method of requesting use of corporate phone service. In this illustration, the Voice and Communication Service Server is a Corporate Phone Service Server 490.

In one embodiment, the corporate phone service is based on Voice over Internet Protocol.

In one embodiment, Corporate Phone Service Server 490 includes a Session Initiation Protocol (SIP) server and a media gateway.

In a one embodiment, Corporate Phone Service Server 490 is an IP PBX.

In one embodiment Corporate Phone Service Server 490 is a Soft Switch. In the same embodiment, Voice VPN Signaling Mediator 430 includes a Session Initiation Protocol (SIP) user agent that communicates with the SIP server in Corporate Phone Service Server 490. Voice VPN Session Mediator 450 includes a codec module equipped with an IP interface to handle the Voice over Internet Protocol (VoIP) packets between itself and Corporate Phone Service Server 490.

Figure 5:
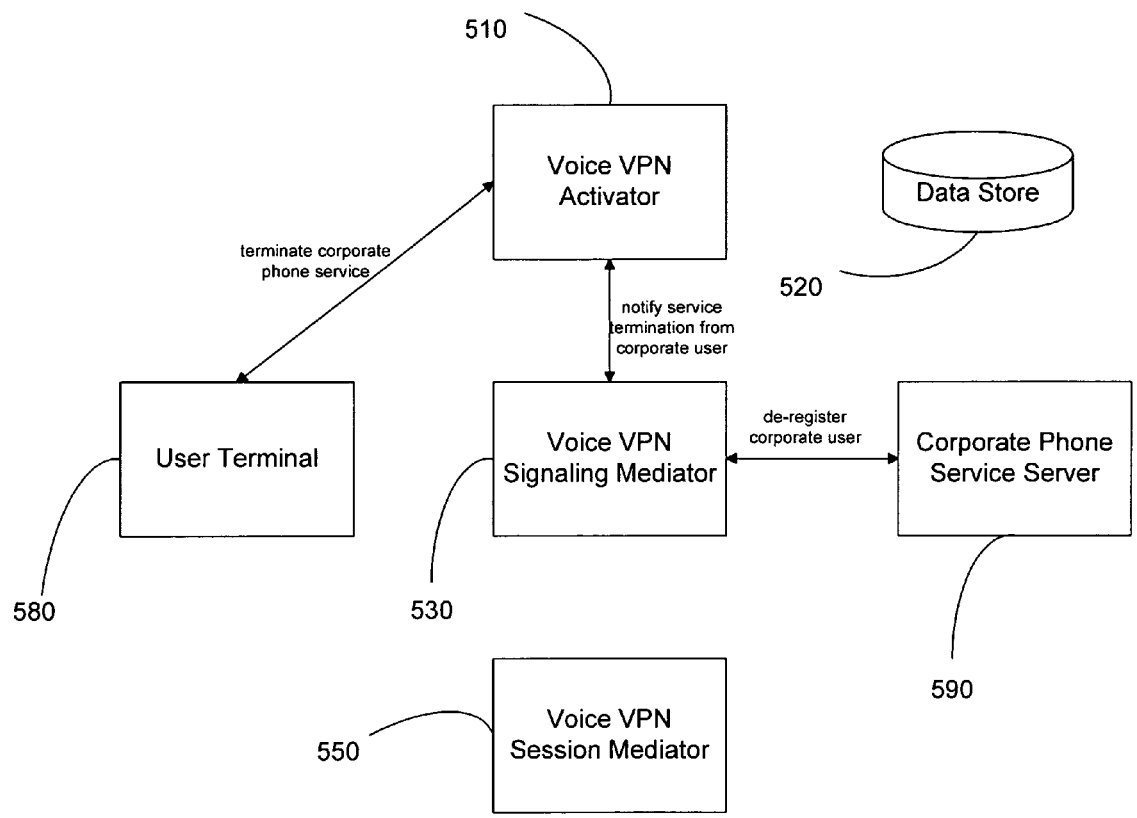
FIG. 5 is a diagram illustrating a method for terminating corporate phone services according to one embodiment of the present invention.

FIG. 5 illustrates a method for terminating corporate phone service. User Terminal 580 requests Voice VPN Activator 510 to terminate the usage of the corporate phone service.

In one embodiment, User Terminal 580 terminates the Voice VPN access, indicating its intention to terminate all in-use voice and communication services including the corporate phone service.

In one embodiment, Voice VPN Activator 510 determines User Terminal 580 is no longer using the corporate phone service, for example, after determining User Terminal 580 is no longer active in Voice VPN communication. Voice VPN Activator 510 notifies Voice VPN Signaling Mediator 530 of the termination of the corporate phone service by the corporate user. Voice VPN Signaling Mediator 530 de-registers the corporate user from Corporate Phone Service Server 590.

In one embodiment, the corporate phone service is always available and does not require a notification of service termination.

Figure 6:
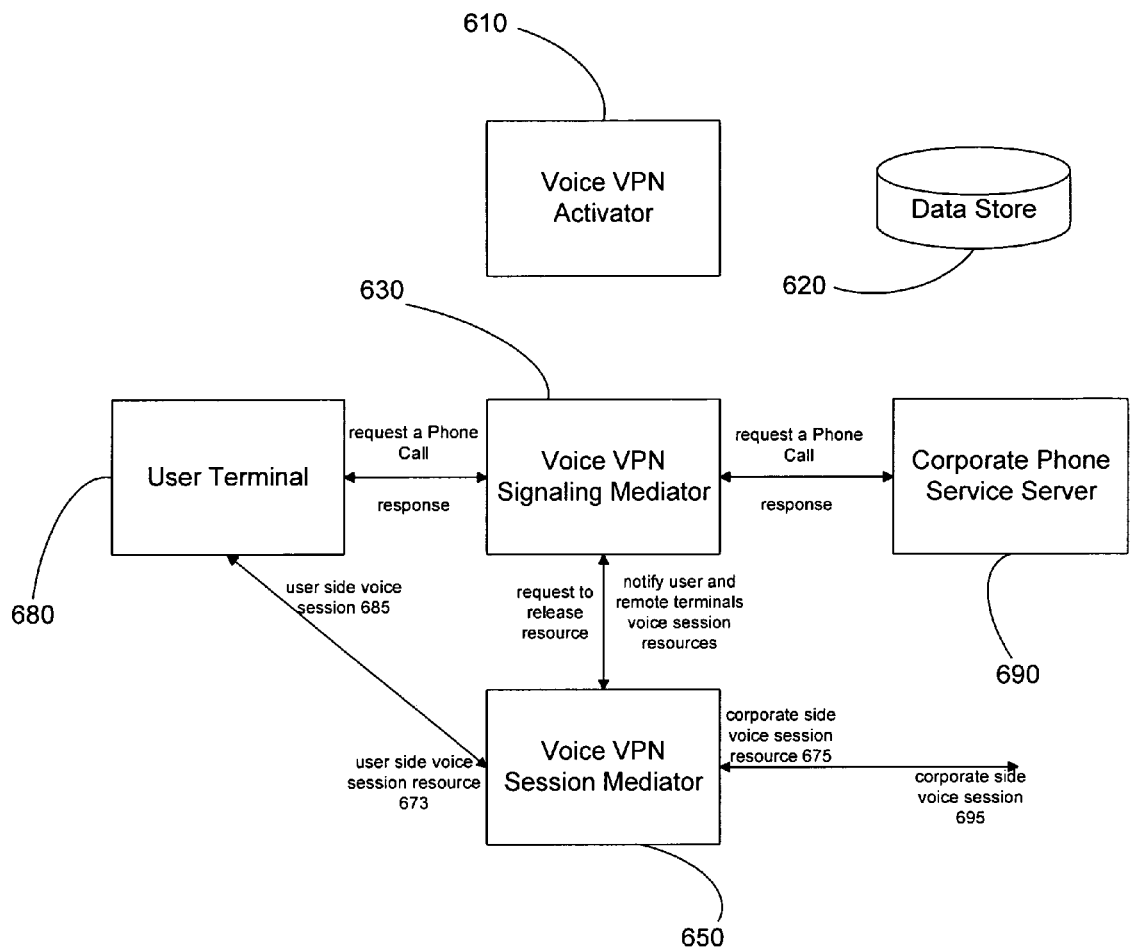
FIG. 6 is a diagram illustrating a method for placing a phone call according to one embodiment of the present invention.

FIG. 6 illustrates a method for making a phone call according to one embodiment of the present invention. A corporate user dials a phone number of a callee. User Terminal 680 informs Voice VPN Signaling Mediator 630 of the callee information which includes the callee phone number and the user terminal voice session resource that is used to establish a voice session with Voice VPN Session Mediator 650. Voice VPN Signaling Mediator 630 requests Voice VPN Session Mediator 650 to reserve a resource that is to be used to establish a corporate side voice session, a resource that is to be used to establish a user side voice session with User Terminal 680, and a resource to mediate between the two sessions. Voice VPN Signaling Mediator 630 also informs Voice VPN Session Mediator 650 of the user terminal voice session resource. Voice VPN Session Mediator 650 responds to Voice VPN Signaling Mediator 630 with reservations for corporate side voice session resource 675 and user side voice session resource 673. Voice VPN Signaling Mediator 630 responds to user terminal 680 with user side voice session resource 673.

In one embodiment, Voice VPN Session Mediator 650 establishes a user side voice session 685 with User Terminal 680 immediately.

In one embodiment, Voice VPN Session Mediator 650 establishes the user side voice session 685 at a later time. Voice VPN Signaling Mediator 630 requests Corporate Phone Service Server 690 to make a phone call to the callee. The request includes the callee phone number and the corporate side voice session resource 675.

In one embodiment, Voice VPN Signaling Mediator 630 includes a SIP user agent and Corporate Phone Service Server 690 includes a SIP server. The request is a SIP INVIT message. This message carries the SDP information which includes the corporate side voice session resource 675, and the callee information which includes the callee phone number. Corporate Phone Service Server 690 subsequently responds positively to the request.

In one embodiment, Corporate Phone Service Server 690 responds with a SIP OK message. The response message includes the corporate side peer voice session resource information so that a corporate side voice session can be established.

In one embodiment, corporate side voice session 695 is between Voice VPN Session Mediator 650 and Corporate Phone Service Server 690.

In one embodiment, the corporate side voice session 695 is between Voice VPN Session Mediator 650 and a telephone system.

In one embodiment, corporate side voice session 695 is between Voice VPN Session Mediator 650 and a Voice VPN Session Mediator, when the callee is another corporate user accessing the corporate Voice VPN. Voice VPN Signaling Mediator 630 notifies Voice VPN Session Mediator 650 of the corporate side peer voice session resource information. Voice VPN Session Mediator 650 establishes corporate side voice session 695.

In one embodiment, Voice VPN Session Mediator 650 establishes the user side voice session 685 with User Terminal 680 at the same time. Voice VPN Signaling Mediator 630 responds positively to User Terminal 680 of successful establishment of a phone call. The corporate user can then conduct the phone conversation with the callee with the reserved resource in Voice VPN Session Mediator 650 that mediates user side voice session 685 and corporate side voice session 695.

Methods for using other common corporate phone features such as voice mail, consultation hold, call transfer, call trace are illustrated in conjunction with FIG. 6.

Corporate Voice Mail Feature

FIG. 6 also illustrates a method by which a corporate user accesses the corporate voice mail feature provided by Corporate Phone Service Server 690. The corporate user activates this feature at User Terminal 680. User Terminal 680 sends this request to Voice VPN Signaling Mediator 630 with the voice mail feature information. Voice VPN Signaling Mediator 630 uses this information to establish the corporate side voice session towards Corporate Phone Service Server 690. Signaling Mediator 630 also instructs the Voice VPN Session Mediator 650 to mediate the user side voice session and the corporate side voice session. The signaling and session mediation procedures are the same as making a phone call to a remote peer user as illustrated in FIG. 6. Upon successful session establishment of the user side voice session and the corporate side voice session, the corporate user is communicating with the voice mail system.

In one embodiment, the voice mail system does not require further user authentication.

Figure 7:
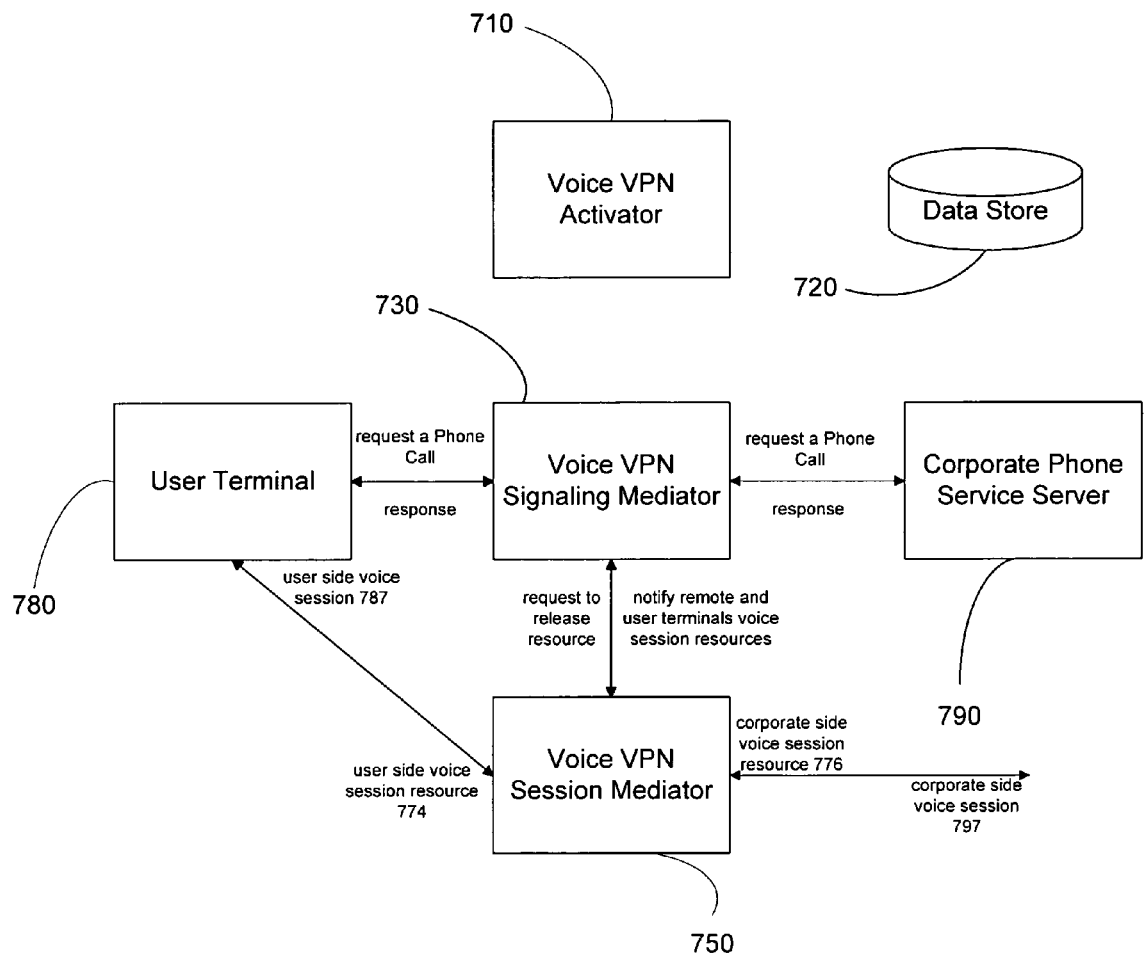
FIG. 7 is a diagram illustrating a method for receiving a phone call according to one embodiment of the present invention.

In another embodiment, the voice mail system prompts the corporate user for user identity information that may include, but is not limited to, a password or access code. Interaction between the corporate user and the voice mail system may use mechanisms such as tone detection or voice recognition. These mechanisms are known to those skilled in the art. The voice mail service session may be terminated by the corporate user as in FIG. 8, or by the voice mail system, which is the remote peer user as illustrated in FIG. 7.

Call Waiting Feature

In one embodiment, while the corporate user is in a phone session with the remote peer user, another remote caller makes a phone call through Corporate Phone Service Server 690 to the corporate user. Corporate Phone Service Server 690 determines the corporate user is reachable through Voice VPN Signaling Mediator 630. Corporate Phone Service Server 690 requests a phone call to the corporate user with Voice VPN Signaling Mediator 630. In such an embodiment, Voice VPN Signaling Mediator 630 supports the Call Waiting feature. Voice VPN Signaling Mediator 630 determines that the corporate user is active on a phone session. It sends a call waiting indication to User Terminal 680 that includes information of the remote caller. Corporate user at User Terminal 680 receives a call waiting alert and decides to accept the new call. User Terminal 680 responds to Voice VPN Signaling Mediator 630 to accept the waiting call. Voice VPN Signaling Mediator 630 communicates with Corporate Phone Service Server 690 to put the original corporate side voice session on hold. Voice VPN Session Mediator 650 establishes a new corporate side voice session with the remote caller as illustrated in the receiving a phone call method in FIG. 7.

Additionally, Voice VPN Signaling Mediator 630 instructs Voice VPN Session Mediator 650 to mediate the user side voice session and the new corporate side voice session. While the corporate user is conversing with the remote caller, the remote peer user is put on hold. The corporate user can alternatively converse between the remote peer user and the remote caller by indicating her choices to Voice VPN Signaling Mediator 630 via User Terminal 680. Voice VPN Signaling Mediator 630 instructs Voice VPN Session Mediator 650 to mediate between the user side voice session and the chosen corporate side voice session.

Call Transfer Feature

In one embodiment, while the corporate user is in a phone session with the remote peer user, the corporate user wants to transfer the remote peer user to a new remote peer user. The corporate user selects the call transfer feature and supplies the phone number of the new remote peer user. User Terminal 680 sends the call transfer feature selection and the new remote peer user information to Voice VPN Signaling Mediator 630. Voice VPN Signaling Mediator 630 sends the call transfer feature selection and the new remote peer user information to Corporate Phone Service Server 690. When the call transfer method is successfully completed, the Corporate Phone Service Server 690 sends a response to the Voice VPN Signaling Mediator 630 indicating the success of the operation.

In one embodiment, Voice VPN Signaling Mediator 630 sends the success indication to User Terminal 680. User Terminal 680 drops the phone call as illustrated in the dropping a call by the corporate user method in FIG. 8.

In another embodiment, Corporate Phone Service Server 690 determines to drop the phone call to User Terminal 680 upon successfully transferring the phone call to the new remote user. Corporate Phone Service Server 690 proceeds to drop the phone call, as illustrated by the dropping a call by the remote peer user method in FIG. 9.

Call Recording Feature

In one embodiment, while the corporate user is in a phone session with the remote peer user, the corporate user wants to record the conversation. The corporate user selects the call recording feature. User Terminal 680 sends the call recording request information to Voice VPN Signaling Mediator 630.

In one embodiment, Voice VPN Signaling Mediator 630 sends the call recording request information to Corporate Phone Service Server 690. Corporate Phone Service Server 690 records the phone session.

In one embodiment, Corporate Phone Service Server 690 sends a recording start indication to Voice VPN Signaling Mediator 630, which sends the recording start indication to User Terminal 680.

In one embodiment, Voice VPN Signaling Mediator 630 does not send the call recording request information to Corporate Phone Service Server 690. Voice VPN Signaling Mediator 630 instructs Voice VPN Session Mediator 650 to record the phone session.

In one embodiment, Voice VPN Signaling Mediator 630 sends a recording start indication to User Terminal 680.

In one embodiment, Voice VPN Signaling Mediator 630 does not send a recording start indication to User Terminal 680. In one embodiment, during the recording of the phone session, Voice VPN Session Mediator 650 records the phone session to Data Store 620.

There are other embodiments of this Call Recording feature, for example, to stop the recording by the corporate user. Skilled in the art should be able to apply the same principle to implement this feature.

The foregoing descriptions illustrate methods for handling a number of commonly used corporate phone service features. It should be obvious to those skilled in the art to apply similar methods to handle other corporate phone service features.

FIG. 7 illustrates a method for receiving a phone call. When a remote caller makes a phone call through the Corporate Phone Service Server 790 to the callee, the corporate user, Corporate Phone Service Server 790 determines the corporate user is reachable through Voice VPN Signaling Mediator 730. Corporate Phone Service Server 790 requests a phone call to the corporate user with Voice VPN Signaling Mediator 730. The request includes the callee information, which includes the callee phone number, and the corporate side peer voice session resource information.

In one embodiment Corporate Phone Service Server 790 includes a SIP server. The request message is a SIP INVIT message. Voice VPN Signaling Mediator 730 matches the callee phone number with all corporate Voice VPN users who had activated the corporate phone service and determines the corporate user as the callee. Voice VPN Signaling Mediator 730 requests Voice VPN Session Mediator 750 to reserve a resource that is to be used to establish a corporate side voice session, a resource that is to be used to establish a user side voice session with User Terminal 780, and a resource to mediate between the two sessions. Voice VPN Signaling Mediator 730, in addition, informs Voice VPN Session Mediator 750 the corporate side peer voice session resource information. Voice VPN Session Mediator 750 reserves the resources and responds to Voice VPN Signaling Mediator 730 with the reserved resource information which includes corporate side voice session resource 776 and user side voice session resource 774.

In one embodiment Voice VPN Signaling Mediator 730 includes a SIP user agent. It responds to the SIP INVIT message with SDP information of corporate side voice session resource 776. In such an embodiment, Voice VPN Session Mediator 750 establishes corporate side voice session 797 with the corporate side peer voice session resource information.

In another embodiment, Voice VPN Session Mediator 750 establishes corporate side voice session 797 at a later time. Voice VPN Signaling Mediator 730 notifies User Terminal 780 of a phone call request. The notification message includes the caller information and user side voice resource information 774. User Terminal 780 alerts the corporate user of a phone call request. The corporate user decides to accept the call. User Terminal 780 responds to Voice VPN Signaling Mediator 73 to accept the phone call. The response message includes the user terminal voice session resource information. Voice VPN Signaling Mediator 730 notifies Voice VPN Session Mediator 750 of the user terminal voice session resource information. Voice VPN Session Mediator 750 establishes user side voice session 787 with User Terminal 780.

In one embodiment, Voice VPN Session Mediator 750 also establishes the corporate side voice session 797 with the corporate side peer voice session resource information. Voice VPN Signaling Mediator 730 responds positively to Corporate Phone Service Server 790. The corporate user can now conduct a phone conversation with the caller with the reserved resource in Voice VPN Session Mediator 750 that mediates user side voice session 787 and corporate side voice session 797.

Figure 8:
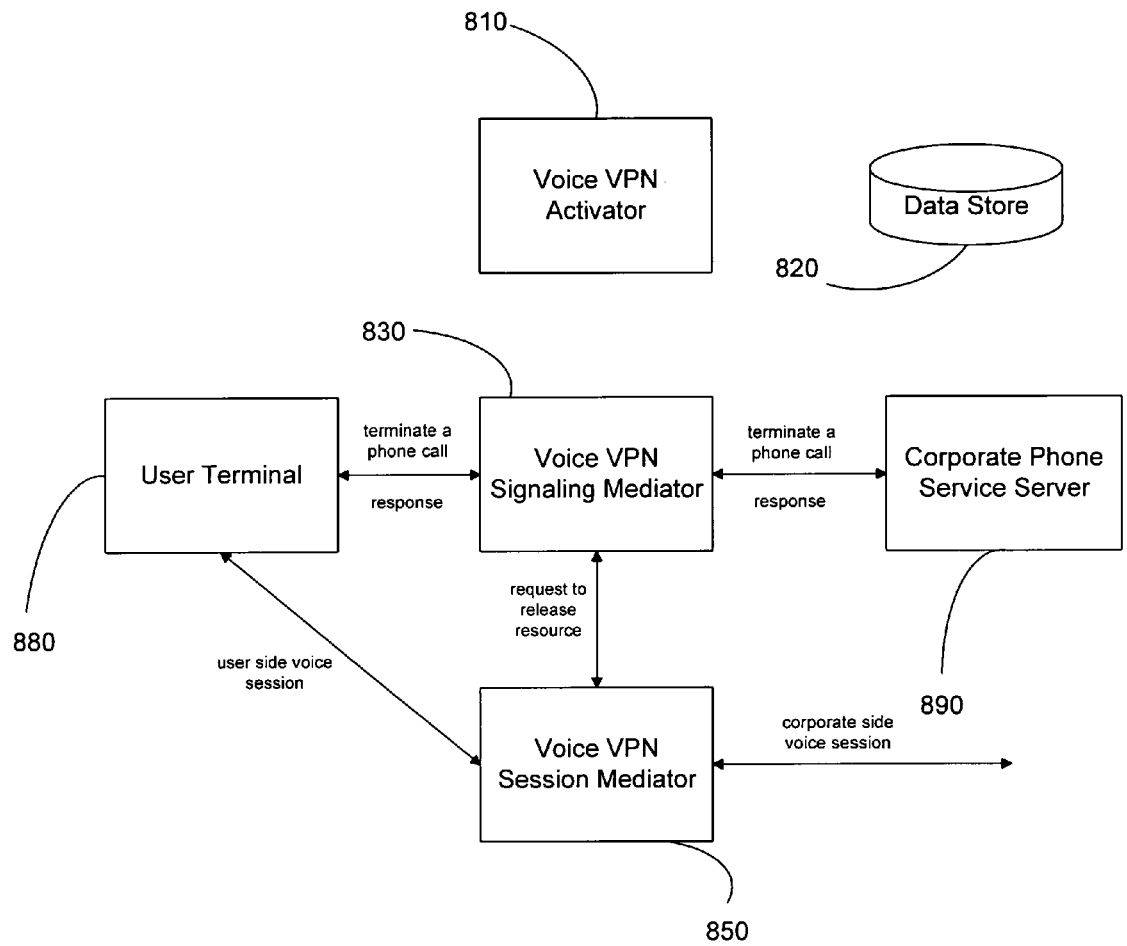
FIG. 8 is a diagram illustrating a method for a corporate user to drop a phone call according to one embodiment of the present invention.

FIG. 8 illustrates a method for dropping a phone call by a corporate user. User Terminal 880 requests Voice VPN Signaling Mediator 830 to terminate a phone call. This request includes the user side voice session information. Voice VPN Signaling Mediator 830 maps the user side voice session information to the corresponding corporate side voice session. Voice VPN Signaling Mediator 830 sends a request to Corporate Phone Service Server 890 to terminate the phone call. This request message includes the corporate side voice session information. Corporate Phone Service Server 890 responds positively to the request.

In one embodiment Corporate Phone Service Server 890 includes a SIP server. The request message is a SIP BYE message. Corporate Phone Service Server 890 responds with a SIP OK message. Voice VPN Signaling Mediator 830 requests Voice VPN Session Mediator 850 to release the voice session resources.

In one embodiment Voice VPN Signaling Mediator 830 sends such a request to Voice VPN Session Mediator 850.

Figure 9:
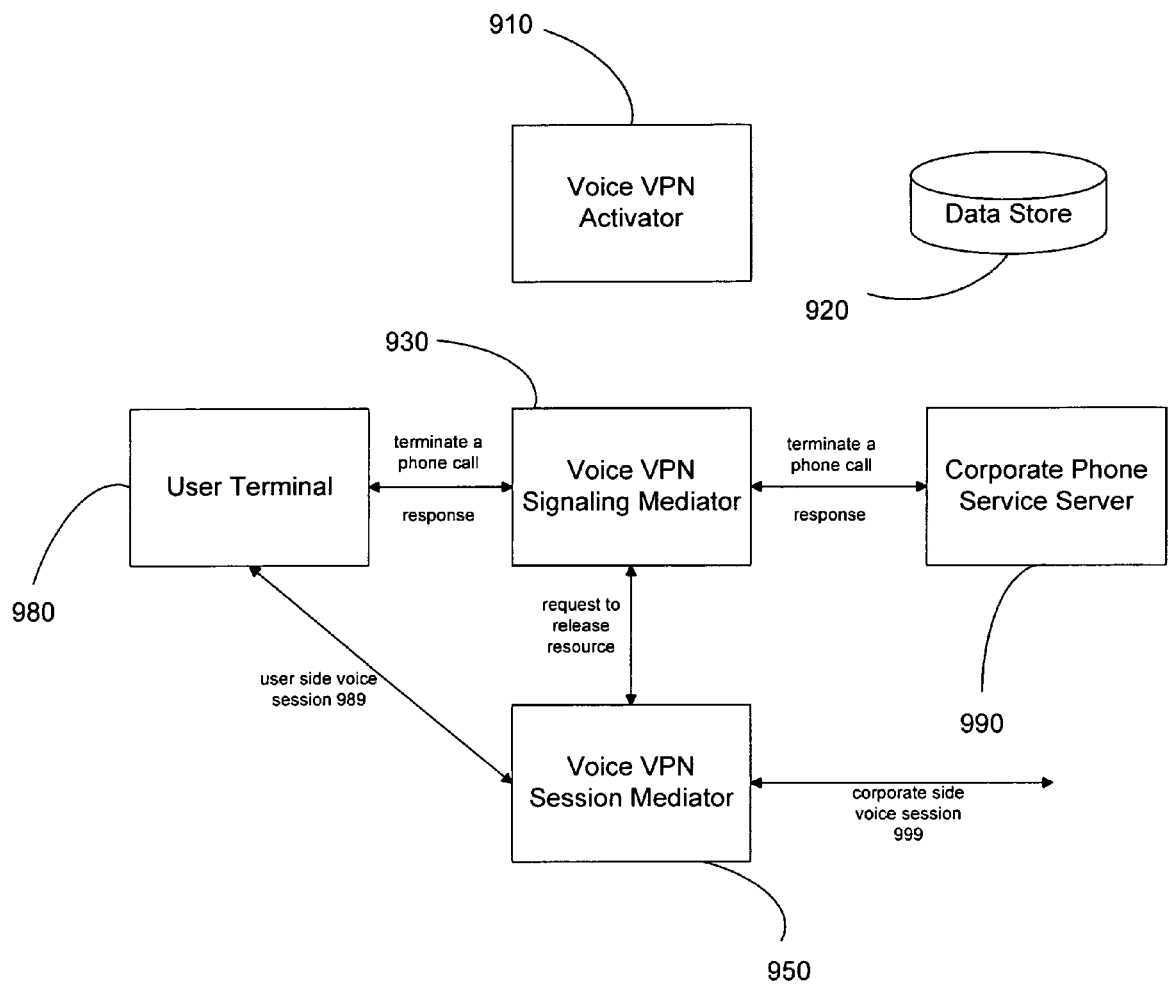
FIG. 9 is a diagram illustrating a method for a remote peer user to drop a phone call according to one embodiment of the present invention.

FIG. 9 illustrates a method for dropping a phone call by the remote peer user. Upon notification of a termination of a phone call by the remote peer user, Corporate Phone Service Server 990 requests Voice VPN Signaling Mediator 930 to terminate a phone call. The request message includes the corporate side voice session information.

In one embodiment, Corporate Phone Service Server 990 includes a SIP server. The request message is a SIP BYE message. Voice VPN Signaling Mediator 930 matches the corporate side voice session information with all active corporate side voice sessions to determine which phone call to terminate. Voice VPN Signaling Mediator 930 notifies User Terminal 908 to terminate the phone call.

In one embodiment, Voice VPN Signaling Mediator 930 does not inform User Terminal 980 of the phone call termination. User Terminal 980 detects inactivity of user side voice session 989 to determine the phone call is terminated.

In one embodiment, User Terminal 980 detects that the user side voice session 989 is disconnected, and determines the phone call is terminated.

In one embodiment, the corporate user detects inactivity of the remote peer user and determines the phone call is terminated. Voice VPN Signaling Mediator 930 requests Voice VPN Session Mediator 950 to release the voice session resources. Voice VPN Session Mediator 950 terminates corporate side voice session 999 and user side voice session 989. Voice VPN Signaling Mediator 930 responds positively to Corporate Phone Service Server 990.

In one embodiment Corporate Phone Service Server 990 includes a SIP server. The response message is a SIP OK message.

In an embodiment, Voice VPN Signaling Mediator 930 responds to Corporate Phone Service Server 990 before requesting Voice VPN Session Mediator 950 to release the voice session resources.

Figure 10:
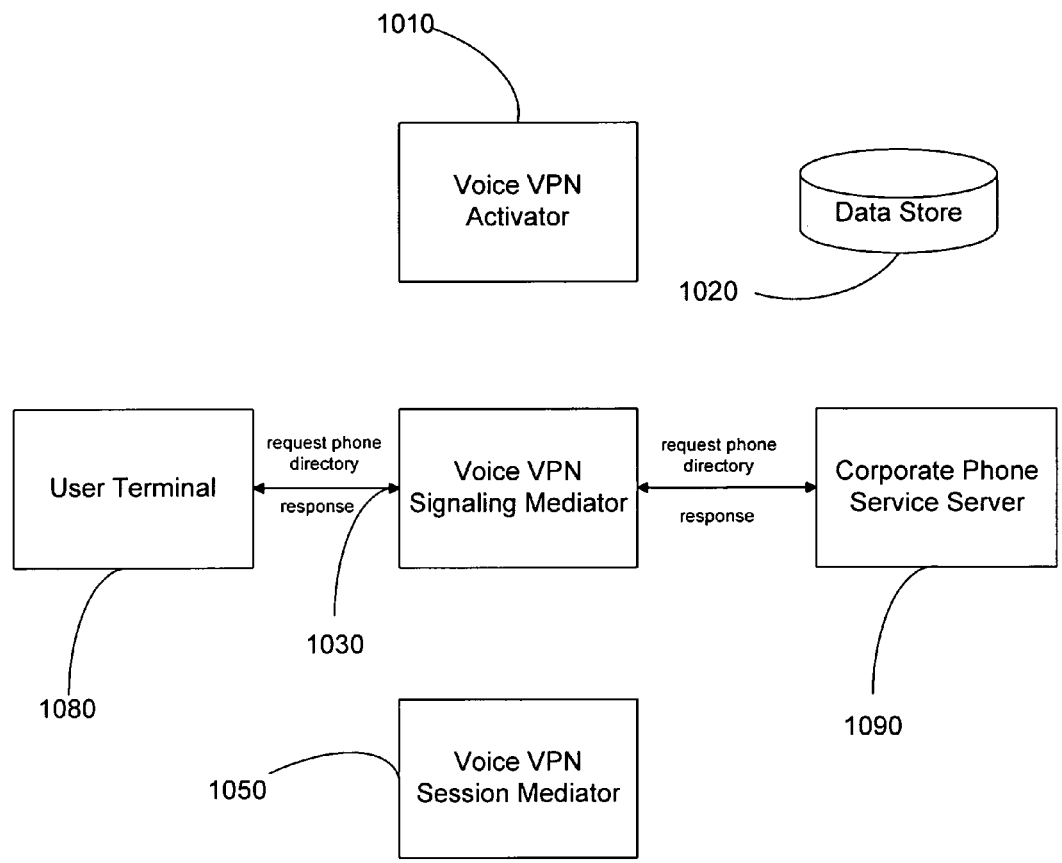
FIG. 10 is a diagram illustrating a method for retrieving a corporate phone directory according to one embodiment of the present invention

FIG. 10 illustrates a method for retrieving a corporate phone directory. User Terminal 1080 requests the corporate phone directory from Voice VPN Signaling Mediator 1030. Voice VPN Signaling Mediator 1030 requests the corporate phone directory from Corporate Phone Service Server 1090. Corporate Phone Service Server 1090 responds with the corporate phone directory. Voice VPN Signaling Mediator 1030 formats the information, and responds to User Terminal 1080 with the corporate phone directory.

In the forgoing descriptions of various possible embodiments of the present invention, the remote peer party is a corporate voice service user inside the realm of the corporate voice network, another Voice VPN user, or a user connected to the corporate network via other networks such as PSTN. The illustrations of the inventions are not limiting to the illustrated corporate phone service. Those skilled in the art should be able to apply the principles of the present invention to other corporate phone service features, as well as other voice and communication services.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A voice network comprising:
a voice virtual private network (VPN) comprising at least one server for providing corporate voice services within the voice VPN;
an access network external to the voice VPN; at least one user terminal external to the voice VPN and coupled to the access network; and
at least one voice VPN gateway coupled to the voice VPN and the access network, wherein the voice VPN gateway comprises:
a voice VPN activator for receiving a request to access the corporate voice services, a voice VPN signaling mediator for, in response to the request to access the corporate voice services, sending a request to a voice VPN session mediator to reserve a corporate side voice session resource for establishing a corporate side voice session, to reserve a user side voice session resource for establishing the user side voice session, and to reserve a resource for mediating between the user side voice session and the corporate side voice session, and
the voice VPN session mediator for, in response to the request from the voice VPN signaling mediator, establishing the corporate side voice session with the server using the corporate side voice session resource, establishing the user side voice session with the user terminal using the user side voice session resource, and mediating communications between the user side voice session and the corporate side voice session using the resource for mediating,
wherein the server provides the corporate voice services to the user terminal via the voice VPN gateway as if the user terminal is accessing the corporate voice services from within the voice VPN.

2. The network of claim 1, wherein the access network is an Internet.

3. The network of claim 1, wherein the access network is an extranet.

4. The network of claim 1, wherein the corporate voice services comprise telephone services provided within the voice VPN.

5. The network of claim 1, wherein the corporate voice services comprises at least one of a list comprising:
a call transfer service; a corporate phone directory service; a service for making a call to a corporate phone number in a corporate phone directory; a corporate voice mail service; and a call recording service.

6. A method for providing access to corporate voice services provided within a voice virtual private network (VPN) by an access network external to the voice VPN, comprising:
(a) receiving by a voice VPN activator of a voice VPN gateway a request to access the corporate voice services, wherein the voice VPN gateway further comprises a voice VPN signaling mediator and a voice VPN session mediator;
(b) in response to the request received by the voice VPN activator, sending by the voice VPN signaling mediator a request to the voice VPN session mediator to reserve a corporate side voice session resource for establishing a corporate side voice session, to reserve a user side voice session resource for establishing a user side voice session, and to reserve a resource for mediating between the user side voice session and the corporate side voice session;
(c) in response to the request from the voice VPN signaling mediator, establishing by the voice VPN session mediator the corporate side voice session with at least one server within the voice VPN using the corporate side voice session resource, the server providing the corporate voice services within the voice VPN, and establishing the user side voice session with a user terminal using the user side voice session resource, the user terminal being external to the voice VPN and coupled to an access network external to the voice VPN; and
(d) mediating by the voice VPN session mediator communications between the user side voice session and the corporate side voice session using the resource for mediating, wherein the server provides the corporate voice services to the user terminal via the voice VPN gateway as if the user terminal is accessing the corporate voice services from within the voice VPN.

7. The method of claim 6, wherein the corporate voice services comprises at least one of a list comprising:
a call transfer service; a corporate phone directory service; a service for making a call to a corporate phone number in a corporate phone directory; a corporate voice mail service; and a call recording service.

8. A computer program product comprising a computer useable storage medium having a computer readable program, wherein when the computer readable program is executed by a computer, causes the computer to:
(a) receive by a voice virtual private network (VPN) activator of a voice VPN gateway a request to access corporate voice services provided within a voice VPN, wherein the voice VPN gateway further comprises a voice VPN signaling mediator and a voice VPN session mediator;
(b) in response to the request received by the voice VPN activator, send by the voice VPN signaling mediator a request to the voice VPN session mediator to reserve a corporate side voice session resource for establishing a corporate side voice session, to reserve a user side voice session resource for establishing a user side voice session, and to reserve a resource for mediating between the user side voice session and the corporate side voice session;
(c) in response to the request from the voice VPN signaling mediator, establish by the voice VPN session mediator the corporate side voice session with at least one server within the voice VPN using the corporate side voice session resource, the server providing the corporate voice services within the voice VPN, and establish the user side voice session with a user terminal using the user side voice session resource, the user terminal being external to the voice VPN and coupled to an access network external to the voice VPN; and
(d) mediate by the voice VPN session mediator communications between the user side voice session and the corporate side voice session using the resource for mediating, wherein the server provides the corporate voice services to the user terminal via the voice VPN gateway as if the user terminal is accessing the corporate voice services from within the voice VPN.

* * * * *